(12) United States Patent
Cheung

(10) Patent No.: US 11,783,649 B2
(45) Date of Patent: *Oct. 10, 2023

(54) CLOUD DOOR LOCK CONTROL SYSTEM WITH IDENTIFICATION OF TIME VARIED 2D CODES

(71) Applicant: Wai Kin Cheung, Hong Kong (CN)

(72) Inventor: Wai Kin Cheung, Hong Kong (CN)

( * ) Notice: Subject to any disclaimer, the term of this patent is extended or adjusted under 35 U.S.C. 154(b) by 120 days.

This patent is subject to a terminal disclaimer.

(21) Appl. No.: 17/409,815

(22) Filed: Aug. 24, 2021

(65) Prior Publication Data

US 2023/0062621 A1  Mar. 2, 2023

(51) Int. Cl.
| | | |
|---|---|---|
| *G07C 9/00* | (2020.01) | |
| *G07C 9/20* | (2020.01) | |
| *G06K 7/14* | (2006.01) | |
| *H04L 9/32* | (2006.01) | |
| *G07C 9/29* | (2020.01) | |

(52) U.S. Cl.
CPC ....... *G07C 9/00309* (2013.01); *G06K 7/1417* (2013.01); *G07C 9/00571* (2013.01); *G07C 9/20* (2020.01); *G07C 9/29* (2020.01); *H04L 9/32* (2013.01); *G07C 2009/00412* (2013.01)

(58) Field of Classification Search
CPC .. G07C 9/00309; G07C 9/00571; G07C 9/20; G07C 9/29; G07C 2009/00412; G07C 9/00182; G07C 2009/0023; G06K 7/1417; H04L 9/32; H04L 67/125
See application file for complete search history.

(56) References Cited

U.S. PATENT DOCUMENTS

| | | | |
|---|---|---|---|
| 10,163,105 B1* | 12/2018 | Ziraknejad | G06Q 20/3274 |
| 10,475,264 B2* | 11/2019 | Jin | H04W 12/00 |
| 2012/0280790 A1* | 11/2012 | Gerhardt | H04L 63/0428 340/5.61 |
| 2014/0051425 A1* | 2/2014 | Ahearn | G07C 9/00571 455/420 |
| 2015/0356801 A1* | 12/2015 | Nitu | G07F 9/002 340/5.61 |
| 2016/0321847 A1* | 11/2016 | Briskey | G07C 9/27 |
| 2017/0103647 A1* | 4/2017 | Davis | H04W 12/068 |
| 2018/0053363 A1* | 2/2018 | Ravida | H04N 7/186 |
| 2019/0096148 A1* | 3/2019 | Hopkins | G07C 9/00571 |
| 2019/0172285 A1* | 6/2019 | Jin | H04W 4/80 |
| 2019/0205865 A1* | 7/2019 | Jamkhedkar | G06K 19/06037 |
| 2020/0043271 A1* | 2/2020 | Anderson | G07C 9/00309 |
| 2020/0250909 A1* | 8/2020 | Li | G06F 16/258 |

(Continued)

*Primary Examiner* — Curtis J King

(57) ABSTRACT

A cloud door lock control system with identification of time varied 2D codes is provided. A cloud device transmits the encryption codes of doors to be opened, the time periods for opening the doors, and the user's encryption codes to the handset through a communication channel and the handset stores these values in a memory. A mobile phone APP receives these values and encrypts them by using a specific encrypting code. The encoding way for the encoding unit is time varied, that is, the QR code from the encoding unit is only retained for a preset time period; after the preset time period has elapsed, the encoding unit generates another QR code. When the cloud device receives the QR code from a card reader, it is decoded. These decoded data is compared with those stored in the cloud device to determine whether the door is necessary to be opened.

7 Claims, 4 Drawing Sheets

(56) References Cited

U.S. PATENT DOCUMENTS

| | | | | |
|---|---|---|---|---|
| 2020/0372743 | A1* | 11/2020 | Miller | G07C 9/257 |
| 2021/0006933 | A1* | 1/2021 | Dean | G16Y 40/10 |
| 2021/0084494 | A1* | 3/2021 | Angelov | H04W 12/08 |
| 2021/0096699 | A1* | 4/2021 | Ormond | G06F 3/04883 |
| 2021/0134096 | A1* | 5/2021 | Pukari | H04B 5/0037 |
| 2021/0170892 | A1* | 6/2021 | Albors Ripoll | H02J 7/0042 |
| 2021/0279983 | A1* | 9/2021 | Imanuel | G07C 9/00309 |
| 2021/0318888 | A1* | 10/2021 | Abbasian | G06F 11/3051 |
| 2021/0321223 | A1* | 10/2021 | Adachi | H04W 12/069 |
| 2022/0174244 | A1* | 6/2022 | Guibene | G06V 20/52 |
| 2022/0207946 | A1* | 6/2022 | Voss | G07C 9/257 |
| 2022/0230498 | A1* | 7/2022 | Prevost | G06V 40/172 |
| 2023/0047088 | A1* | 2/2023 | Blasband | G07C 9/00571 |

\* cited by examiner

CLOUD DOOR LOCK CONTROL SYSTEM WITH IDENTIFICATION OF TIME VARIED 2D CODES

FIELD OF THE INVENTION

The present invention is related to control of opening of doors, and in particular to a cloud door lock control system with identification of time varied 2D codes

BACKGROUND OF THE INVENTION

Currently, 2D codes are used as a tool for identification of a profile so as to unlock a door, such as a home door, an office door, a factory door, a door in the markets, or for unlocking of a storing cabinet in a bus station. 2D codes are codes for storing specific information and can be attached to an object. Currently, 2D codes are widely used to the identification of personal information. For example, a mobile phone APP could generate a specific 2D code which presents the profiles of a person. A controller in a door can scan the 2D code and decode it so as to identify the profile for proceeding operations.

Above mentioned prior art for identifying 2D codes is permanent, while if another person having the 2D code, he (or she) still can pass the identification. Therefore, if this 2D code is copied illegally by another person, he can pass the identification of the profile. This prior way is unbeneficial to the control of members and is a serious threaten to the safety of the owners.

Conventionally, controllers are installed in respective doors, and decoders built within the controller are used in decoding and identification. This conventional way is low safety and need high cost. Further, if these controllers are installed individually for the doors and are not interconnected, it is unbeneficial to the management of central controller.

SUMMARY OF THE INVENTION

Accordingly, the object of the present invention is to provide a cloud door lock control system with identification of time varied 2D codes, wherein the controller (that is the cloud device 10) are installed in cloud, instead of being at the door end. QR code is transferred to the cloud device and then is decoded and identified in the cloud device. The cost for installing the controllers is saved. Furthermore, a plurality of doors in one unit use same system and door control is performed by the cloud device. Furthermore the messages for door control and users are stored in the cloud device and thus it is unnecessary to worry about the stealing of the message. The cloud device can understand the status of various doors in the unit and thus can monitor different areas in the unit effectively.

To achieve above object, the present invention provides a cloud door lock control system with identification of time varied 2D codes, comprising: a cloud device for transmitting a mobile phone APP to a handset; the cloud device storing all encryption codes of doors to be opened, time periods for opening the doors, and user's encryption codes; the cloud device frequently transmitting the encryption codes of doors to be opened, the time periods for opening the doors, and the user's encryption codes to the handset based on a preset period through a first communication channel and the handset stores these values in a memory; a mobile phone APP for receiving the encryption codes of doors to be opened, the time periods for opening the doors, and the user's encryption codes emitted from the cloud device; wherein in use, the cloud device further transmits the user's encryption code to the user by a second communication channel; the user's encryption code is inputted to a handset with a mobile phone APP to replace the previous user's encryption code stored in the mobile phone APP and then the user's encryption code is stored in a memory in the handset; the mobile phone APP includes an encoding unit which uses an specific encrypting code to further encrypting the encryption code of the door to be opened, the door time periods for opening the door and the user's encryption code and then converting them into a QR code; and wherein the encoding way for the encoding unit is time varied, that is, the QR code from the encoding unit is only retained for a preset time period; after the preset time period has elapsed, the encoding unit generates another QR code for the encryption code of the door to be opened, the door time periods for opening the door and the user's encryption code; the cloud device also stores the encryption code of the door to be opened, the door time periods for opening the door and the user's encryption code, and encrypting way of the encoding unit and the specific encrypting codes of the encoding unit; and therefore, the cloud device can decode the QR code generated by the encoding unit; a card reader positioned on the door and signally connected to the cloud device; the card reader serving for reading the QR code in the handset and transfers the QR code to the cloud device for decoding; and wherein when the cloud device receives the QR code from the card reader, the QR code is decoded to obtain the encryption code of the door to be opened, the door time periods for opening the door and the user's encryption code; these decoding data is compared with the respective the encryption code of the door to be opened, door time periods for opening the door and user's encryption code stored in the cloud device; if they are matched, the card reader transfers a signal for opening the door to the door for opening the door; if in the comparing, they are unmatched, the cloud device transfers an error message to the handset.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 4, the structure of the present invention is illustrated in the following.

Figure 1:
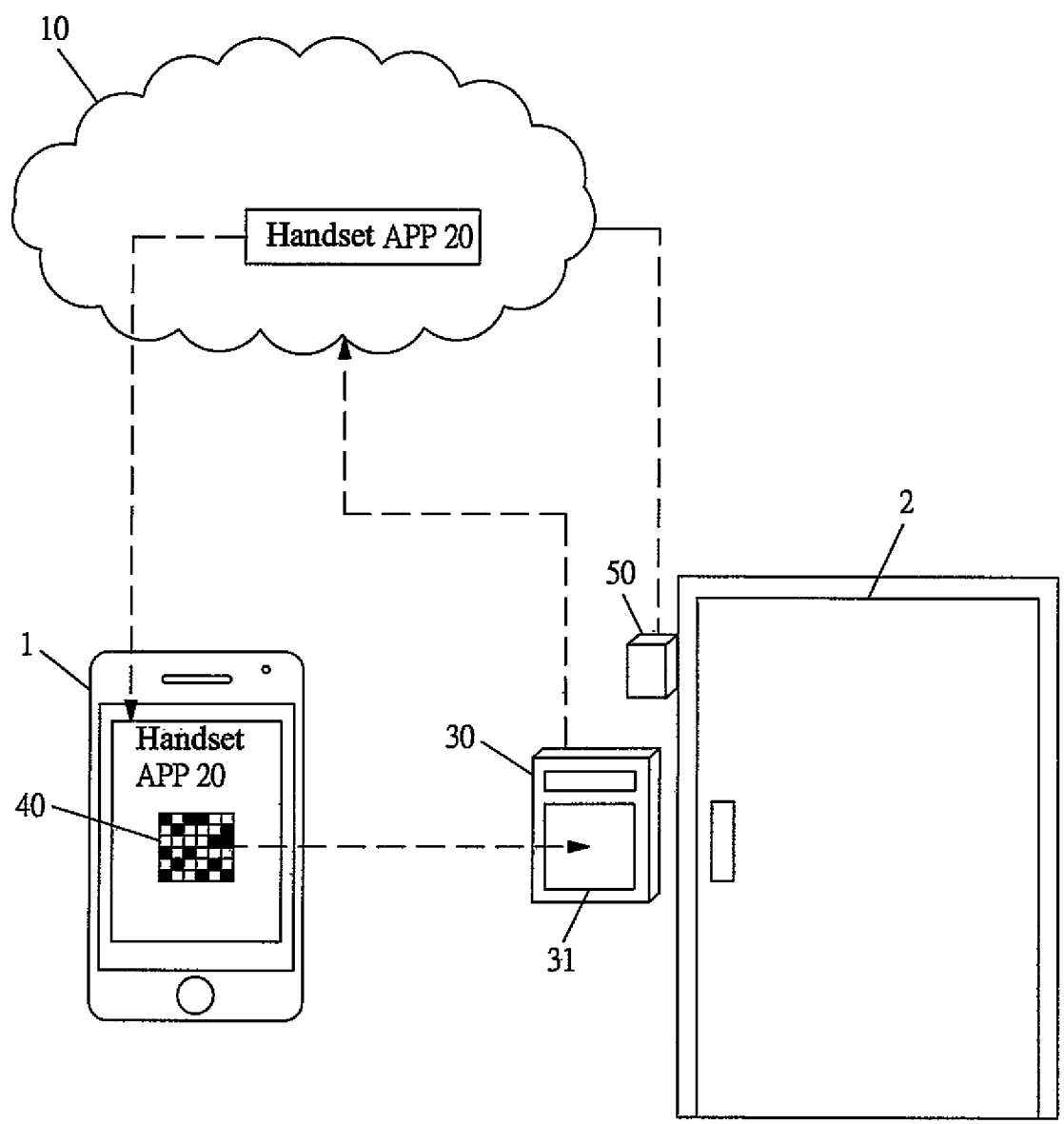
FIG. 1 is a schematic view about the practical installation of the present invention.

A cloud device 10 serves to transmit a mobile phone APP 20 to a handset 1, as illustrated in FIG. 1. The cloud device 10 stores all the encryption codes of doors 2 to be opened, the time periods for opening the doors, and the user's encryption codes.

A mobile phone APP 20 serves to receive the encryption codes of doors 2 to be opened, the time periods for opening the doors, and the user's encryption codes emitted from the cloud device 10. A user's encryption code is dedicated to a specific handset 1, that is, the specific user's encryption code is dedicated to a specific handset 1. The cloud device transmits the encryption codes of doors 2 to be opened, the time periods for opening the doors, and the user's encryption codes to the handset 1 based on a preset period through a first communication channel; and then the mobile phone APP stores these values in a memory;

In use, the cloud device 10 further transmits the user's encryption code to the user by using a second communication channel, such as short messages, or emails, etc. The user can input the user's encryption code to a handset 1 with a mobile phone APP 20 and then the user's encryption code is stored in a memory 3 to replace the previous user's encryption code. The mobile phone APP 20 includes an encoding unit 21 which uses an specific encrypting code to further encrypting the encryption code of the door 2 to be opened, the door time periods for opening the door and the user's encryption code and then converting them into a QR code 40.

The encoding way for the encoding unit 21 is time varied, that is, the QR code 40 from the encoding unit 21 is only retained for a preset time period. After the preset time period, the encoding unit 21 generates another QR code 40 for the encryption code of the door 2 to be opened, door time periods for opening the door and user's encryption code. The cloud device 10 also stores the encryption code of the door 2 to be opened, the door time periods for opening the door and the user's encryption code, and encrypting way of the encoding unit 21 and the specific encrypting code of the encoding unit 21. Therefore, the cloud device 10 can decode this QR code 40 generated by the encoding unit 21.

A card reader 30 is positioned on the door 2 and is signally connected to the cloud device 10. The card reader 30 serves to read the QR code 40 in the handset 1 and transfers the QR code 40 to the cloud device 10 for decoding. The card reader 30 includes a reading device 31 (such as a scanner) for reading the QR code 40, and a transceiver 32 for transferring the QR code 40 to the cloud device 10.

When the cloud device 10 receives the QR code 40 from the card reader 30, the QR code 40 is decoded to get the encryption code of the door 2 to be opened, door time periods for opening the door and user's encryption code. These decoding data is compared with the respective the encryption code of the door 2 to be opened, door time periods for opening the door and user's encryption code stored in the cloud device 10. If they are matched, the card reader 30 transfers a signal for opening the door 2 to the door 2 for opening the door. If in the comparing, they are unmatched, the cloud device 10 transfers an error message to the handset 1.

Figure 2:
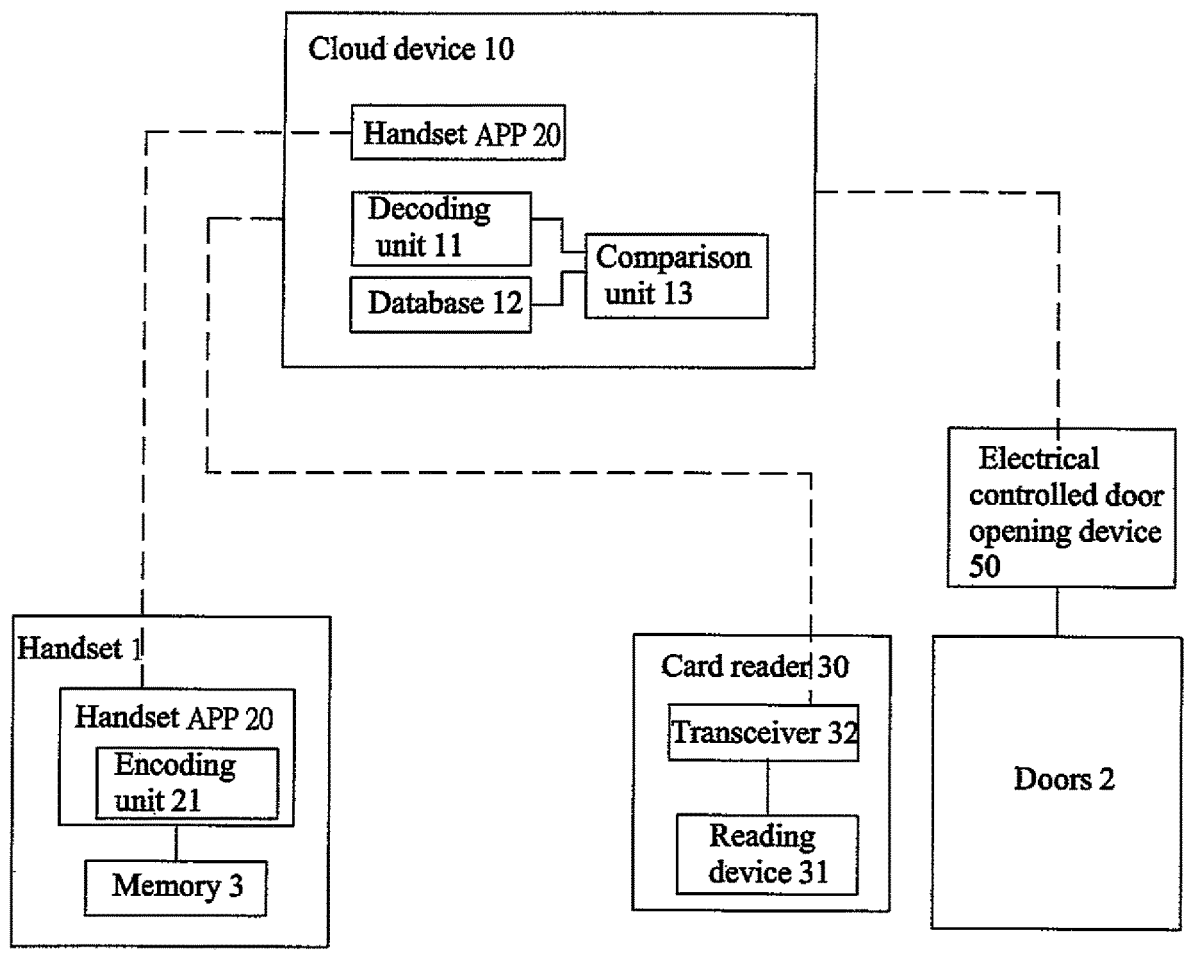
FIG. 2 is a functional block diagram of the present invention.
Figure 3:
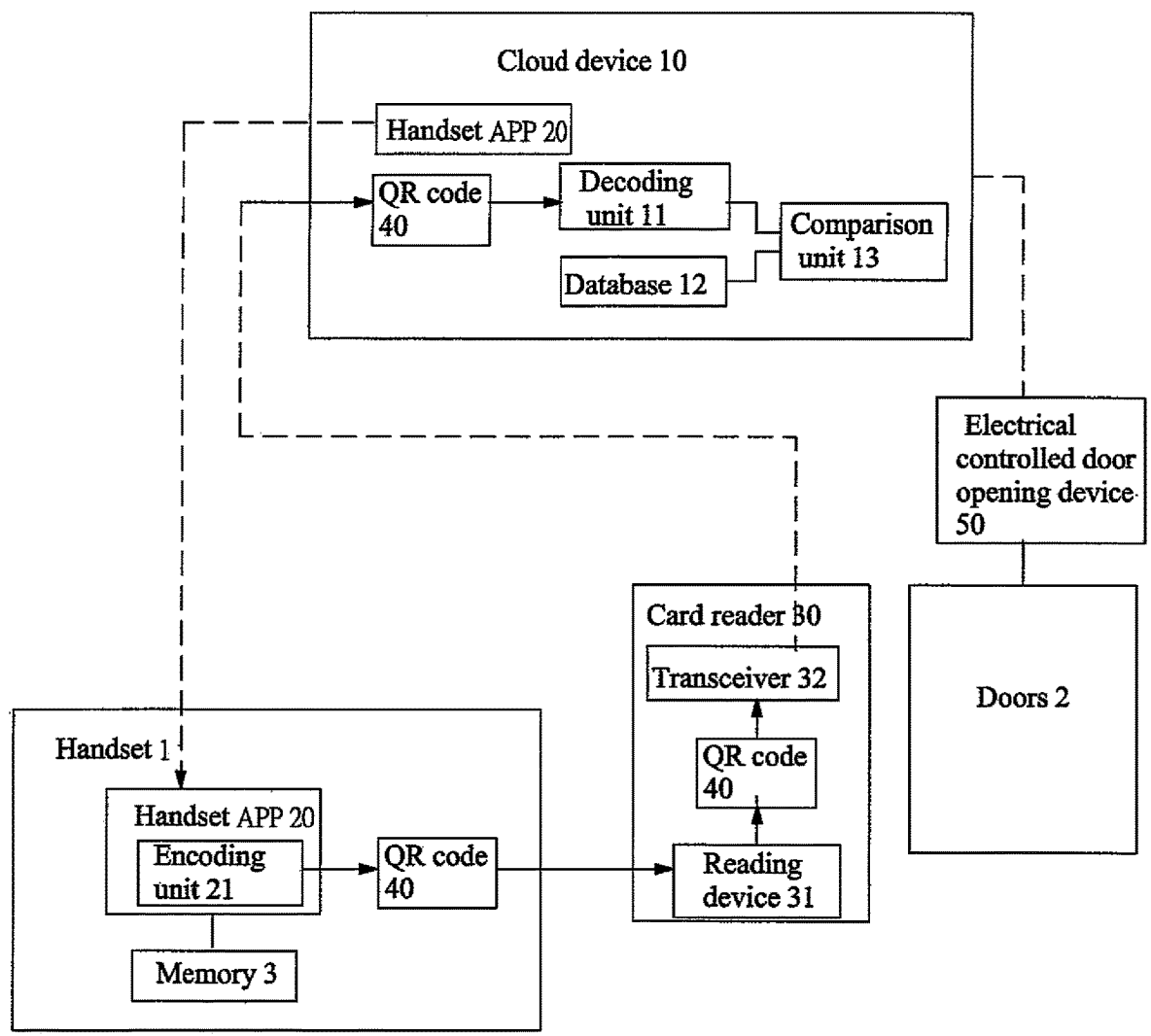
FIG. 3 is a schematic view showing the operation of the present invention.

With referring to FIGS. 2 and 3, the cloud device 10 further comprises:

A decoding unit 11 serve to decode the QR code 40 transferred from the card reader 30 so as to get the encryption code of the door 2 to be opened, the door time periods for opening the door and the user's encryption code. The decoding unit 11 stores the encryption way and the specific encrypting code which are identical to those of the mobile phone APP 20 for decoding the QR code 40.

A database 12 stores the encryption code of the door 2 to be opened, the door time periods for opening the door and the user's encryption code, and indications of doors which are permitted to be passed by specific users.

A comparison unit 13 is connected to the database 12 and the decoding unit 11. The comparison unit 13 serves to compare encryption code of the door 2 to be opened, the door time periods for opening the door and the user's encryption code decoded by the decoding unit 11 from the decoding unit 11 with the encryption code of the door 2 to be opened, the door time periods for opening the door and the user's encryption code stored in the database 12.

An electrical controlled door opening device 50 is connected to the door 2 for receiving the door opening signal from the cloud device 10.

Figure 4:
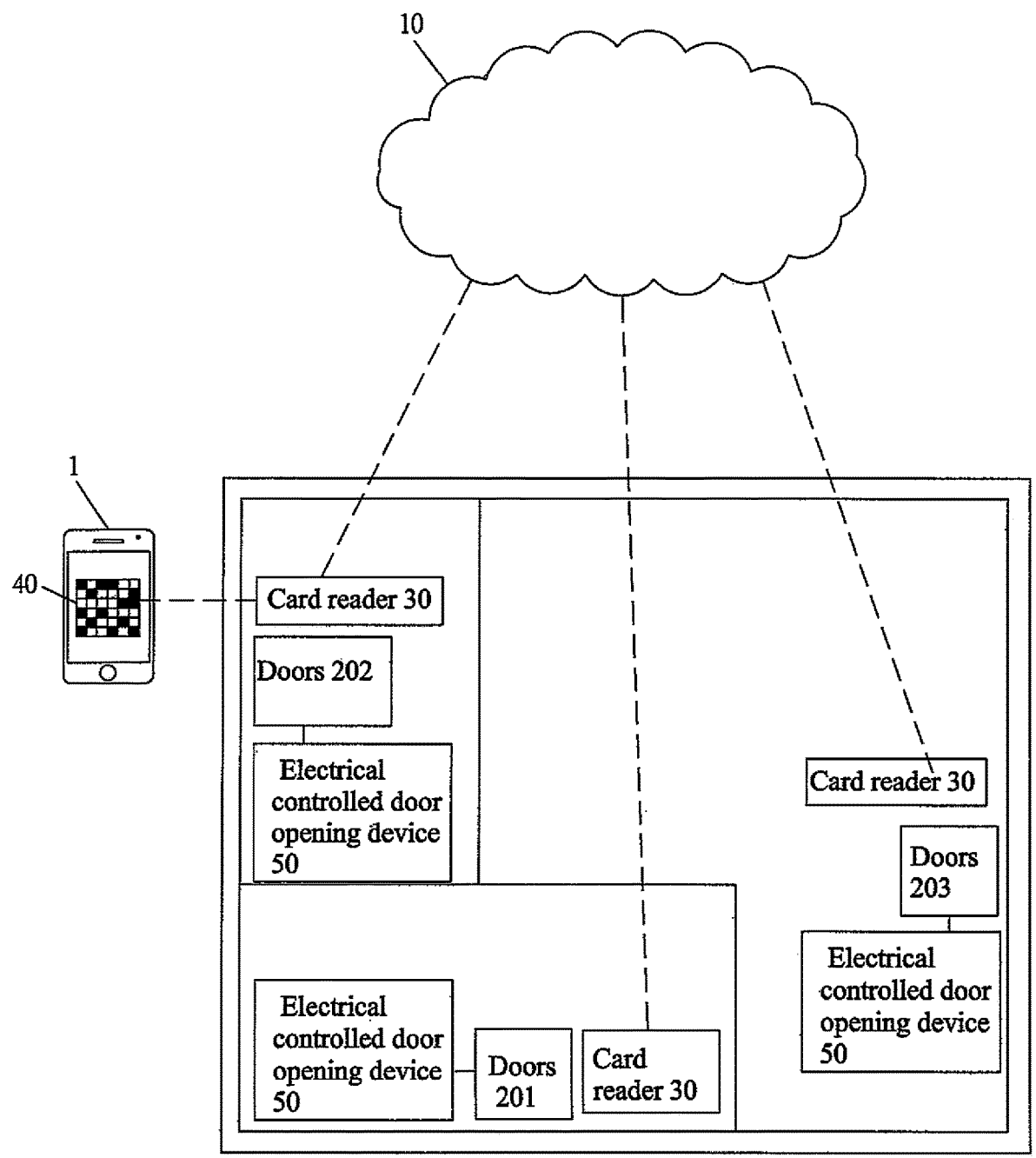
FIG. 4 shows an application example of the present invention.

With reference to FIG. 4, it is illustrated that there are many doors 201, 202, 203 in one unit 100. Each door has a respective card reader 30 which are connected to the cloud device 10. Therefore, cloud device 10 can control all the doors 201, 202 and 203 through the card readers 30.

Advantages of the present invention are that the controller (that is the cloud device 10) are installed in cloud, instead of being at the door end. QR code is transferred to the cloud device and then is decoded and identified in the cloud device. The cost for installing the controllers is saved. Furthermore, a plurality of doors in one unit use same system and door control is performed by the cloud device. Furthermore the messages for door control and users are stored in the cloud device and thus it is unnecessary to worry about the stealing of the message. The cloud device can understand the status of various doors in the unit and thus can monitor different areas in the unit effectively.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cloud door lock control system with identification of time varied 2D codes, comprising:

a cloud device for transmitting a mobile phone APP to a handset; the cloud device storing all encryption codes of doors to be opened, time periods for opening the doors, and user's encryption codes; the cloud device frequently transmitting the encryption codes of doors to be opened, the time periods for opening the doors, and the user's encryption codes to the handset based on a preset period through a first communication channel and the handset stores these values in a memory;

a mobile phone APP for receiving the encryption codes of doors to be opened, the time periods for opening the doors, and the user's encryption codes emitted from the cloud device;

wherein in use, the cloud device further transmits the user's encryption code to a user by a second communication channel; the user's encryption code is inputted to a handset with a mobile phone APP to replace the previous user's encryption code stored in the mobile phone APP and then the user's encryption code is stored in the memory in the handset; the mobile phone APP includes an encoding unit which uses an specific encrypting code to further encrypting the encryption code of the door to be opened, the door time periods for opening the door and the user's encryption code and then converting them into a QR code;

wherein the encoding way for the encoding unit is time varied, that is, the QR code from the encoding unit is only retained for a preset time period; after the preset time period has elapsed, the encoding unit generates another QR code for the encryption code of the door to be opened, the door time periods for opening the door and the user's encryption code; the cloud device also stores the encryption code of the door to be opened, the door time periods for opening the door and the user's encryption code, and encrypting way of the encoding unit and the specific encrypting codes of the encoding unit; and therefore, the cloud device can decode the QR code generated by the encoding unit;

a card reader positioned on the door and signally connected to the cloud device; the card reader serving for reading the QR code in the handset and transfers the QR code to the cloud device for decoding; and wherein when the cloud device receives the QR code from the card reader, the QR code is decoded to obtain the encryption code of the door to be opened, the door time periods for opening the door and the user's encryption code; these decoding data is compared with the respective the encryption code of the door to be opened, door time periods for opening the door and user's encryption code stored in the cloud device; if they are matched, the card reader transfers a signal for opening the door to the door for opening the door; if in the comparing, they are unmatched, the cloud device transfers an error message to the handset.

2. The cloud door lock control system with identification of time varied 2D codes as claimed in claim 1, wherein the second communication channel is short messages or emails.

3. The cloud door lock control system with identification of time varied 2D codes as claimed in claim 1, wherein an electrical controlled door opening device is connected to the door for receiving the door opening signal from the cloud device.

4. The cloud door lock control system with identification of time varied 2D codes as claimed in claim 1, wherein a user's encryption code is dedicated to a specific handset, that is, the specific user's encryption code is dedicated to a specific handset.

5. The cloud door lock control system with identification of time varied 2D codes as claimed in claim 1, wherein the card reader includes a reading device for reading the QR code, and a transceiver for transferring the QR code to the cloud device.

6. The cloud door lock control system with identification of time varied 2D codes as claimed in claim 1, wherein the cloud device further comprises:

a decoding unit for decoding the QR code transferred from the card reader so as to obtain the encryption code of the door to be opened, the door time periods for opening the door and the user's encryption code; the decoding unit stores the encryption way and specific encrypting code which are identical to those of the mobile phone APP for decoding the QR code;

a database storing the encryption code of the door to be opened, the door time periods for opening the door and the user's encryption code; and indications about doors which are permitted to be passed by specific users; and a comparison unit connected to the database and the decoding unit; the comparison unit serving to compare the encryption code of the door to be opened, the door time periods for opening the door and the user's encryption code decoded by the decoding unit decoding from the decoding unit with the encryption code of the door to be opened, the door time periods for opening the door and the user's encryption code stored in the database.

7. The cloud door lock control system with identification of time varied 2D codes as claimed in claim 1, wherein there are many doors in one unit; and each door has a respective card reader which are connected to the cloud device; and therefore, cloud device can control all the doors through the card readers.

* * * * *